(12) United States Patent
Senoo et al.

(10) Patent No.: US 12,483,348 B2
(45) Date of Patent: Nov. 25, 2025

(54) OPTICAL COMMUNICATION DEVICE, OPTICAL ACCESS SYSTEM AND OPTICAL COMMUNICATION METHOD

(71) Applicant: NTT, Inc., Tokyo (JP)

(72) Inventors: Yumiko Senoo, Musashino (JP); Shin Kaneko, Musashino (JP); Ryo Koma, Musashino (JP); Kazuaki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 209 days.

(21) Appl. No.: 18/035,900

(22) PCT Filed: Nov. 17, 2020

(86) PCT No.: PCT/JP2020/042763
§ 371 (c)(1),
(2) Date: May 8, 2023

(87) PCT Pub. No.: WO2022/107194
PCT Pub. Date: May 27, 2022

(65) Prior Publication Data
US 2023/0421283 A1 Dec. 28, 2023

(51) Int. Cl.
*H04B 10/077* (2013.01)
*H04J 14/08* (2006.01)
*H04Q 11/00* (2006.01)

(52) U.S. Cl.
CPC ............ *H04J 14/08* (2013.01); *H04B 10/077* (2013.01); *H04Q 11/0062* (2013.01); *H04Q 2011/0088* (2013.01)

(58) Field of Classification Search
CPC ... H04B 10/077; H04J 14/08; H04Q 11/0062; H04Q 2011/0088
USPC ...................................... 398/25, 98
See application file for complete search history.

(56) References Cited

U.S. PATENT DOCUMENTS

| | | | |
|---|---|---|---|
| 2010/0080558 A1* | 4/2010 | Kazawa | H04J 3/0682 398/66 |
| 2011/0150482 A1* | 6/2011 | Furusawa | H04Q 11/0067 398/79 |
| 2021/0126767 A1* | 4/2021 | Park | H04B 10/50 |
| 2022/0116109 A1* | 4/2022 | Uematsu | H04L 69/40 |

OTHER PUBLICATIONS

ITU-T G.989.2 Recommendation, "40-Gigabit-capable-passive optical networks 2(NG PON2): Physical media dependent (PMD) layer specification," Feb. 2019.
Y. Luo, et al., "Physical Layer Aspects of NG-PON2 Standards-Part 2:System Design and Technology Feasibility [Invited]," J. Opt. Com-mun. Netw., 8(1), pp. 43-52, Jan. 2016.

* cited by examiner

*Primary Examiner* — Li Liu
(74) *Attorney, Agent, or Firm* — Harness, Dickey & Pierce, P.L.C.

(57) ABSTRACT

An optical communication device that communicates with another optical communication device by using at least a time division multiplexing system, the optical communication device including: a management control signal division unit that divides a management control signal used for management and control; and a transmission unit that transmits the management control signal divided, by including the management control signal divided in a burst signal to be transmitted at an assigned transmission timing.

9 Claims, 11 Drawing Sheets

OPTICAL COMMUNICATION DEVICE, OPTICAL ACCESS SYSTEM AND OPTICAL COMMUNICATION METHOD

CROSS-REFERENCE TO RELATED APPLICATIONS

This application is a 371 U.S. National Phase of International Application No. PCT/JP2020/042763, filed on Nov. 17, 2020. The entire disclosure of the above application is incorporated herein by reference.

TECHNICAL FIELD

The present invention relates to an optical communication device, an optical access system and an optical communication method.

BACKGROUND ART

Fiber To The Home (FTTH) is spreading worldwide, and most of FTTH is provided by a TDM-Passive Optical Network (TDM-PON) system having excellent economic efficiency. In the TDM-PON system, one optical line terminal (OLT) (subscriber line terminal station device) accommodates a plurality of subscriber line terminal station devices (optical network units (ONUs)) by time division multiplexing (TDM).

FIG. 10 illustrates a configuration of a conventional TDM-PON system. As illustrated in FIG. 10, a conventional TDM-PON system 500 includes one OLT 510 and a plurality of ONUs 520. The OLT 510 and the plurality of ONUs 520 are connected to each other by one or more optical splitters 530, 540, and 550, and optical fibers. FIG. 10 illustrates a configuration in which the optical splitter 530 is connected to the OLT 510 by an optical fiber, the optical splitters 540 and 550 are connected to the optical splitter 530 by optical fibers, and two each of the ONUs 520 are connected to the optical splitters 540 and 550 by optical fibers. The plurality of ONUs 520 transmits data at transmission timings assigned from the OLT 510.

The OLT 510 includes an optical multiplexing/demultiplexing unit 511, an optical transmission unit 512, an optical reception unit 513, and a media access control unit 514. The optical multiplexing/demultiplexing unit 511 separates an uplink signal and a downlink signal from each other. The optical transmission unit 512 converts data of an electrical signal to be transmitted into an optical signal. The optical reception unit 513 converts an optical signal output from the optical multiplexing/demultiplexing unit 511 into an electrical signal. To share an optical fiber among the plurality of ONUs 520, the media access control unit 514 schedules an amount of transmission and a transmission timing for each ONU 520, and generates a gate frame. The media access control unit 514 transmits the generated gate frame to the ONU 520 via the optical transmission unit 512.

The ONU 520 includes an optical multiplexing/demultiplexing unit 521, an optical transmission unit 522, an optical reception unit 523, and a media access control unit 524. The optical multiplexing/demultiplexing unit 521 separates an uplink signal and a downlink signal from each other. The optical transmission unit 522 converts data of an electrical signal to be transmitted into an optical signal. The optical reception unit 523 converts an optical signal output from the optical multiplexing/demultiplexing unit 521 into an electrical signal. The media access control unit 524 processes the gate frame transmitted from the OLT 510 and generates a report frame for bandwidth request to the OLT 510. The ONU 520 grasps the transmission timing of the data from information on the transmission timing included in the gate frame, and transmits the data at the assigned transmission timing.

On the other hand, in International Telecommunication Union-Telecommunication Standardization Sector (ITU-T) G.989.2 Recommendation, a PON system is defined that performs wavelength multiplexing called Point to Point Wavelength Division Multiplexing-PON (PtP WDM-PON) (see, for example, Non Patent Literature 1). In a PtP WDM-PON system, communication is performed using different wavelengths for respective ONUs in an uplink direction that is a direction from the ONU to the OLT and a downlink direction that is a direction from the OLT to the ONU.

As described in Non Patent Literature 1, in the PtP WDM-PON system, a management control signal called an auxiliary management and control channel (AMCC) is used as a signal for management and control used between the OLT and the ONU. The AMCC signal is a signal that is transmitted by being superimposed on a main signal after information to be transmitted is modulated by a predetermined method. The AMCC signal is superimposed on the main signal and transmitted, whereby the OLT and the ONU can transmit the signal for management and control within a wavelength range of a wavelength used in the main signal. That is, management and control can be implemented without using a dedicated wavelength range for management and control. In a case where the AMCC signal is used for management and control, in the PtP WDM-PON system, a wavelength determining process in which an uplink wavelength and a downlink wavelength are determined is implemented by using the AMCC signal.

According to Non Patent Literature 1, there are two types of AMCC signal superimposition methods. A first scheme "baseband modulation" is a method of superimposing an AMCC signal on the main signal by a baseband signal on a transmitter (for example, the ONU) side. In a "baseband modulation" superimposition method, the AMCC signal is separated by a filter such as a low-pass filter (LPF) on a receiver (for example, the OLT) side.

A second scheme "low-frequency pilot tone" is a method in which the AMCC signal is up-converted to a certain carrier frequency and superimposed on the main signal on the transmitter side. In a "low-frequency pilot tone" superimposition method, the AMCC signal is acquired by performing demodulation by signal processing or the like in the receiver side.

FIG. 11 illustrates a configuration of the PtP WDM-PON system using "low-frequency pilot tone". As illustrated in FIG. 11, a conventional PtP WDM-PON system 600 includes a plurality of OLTs 610 and a plurality of ONUs 620. The plurality of OLTs 610 and the plurality of ONUs 620 are connected to each other by a wavelength demultiplexing unit 630, an optical splitter 640, and optical fibers. FIG. 11 illustrates a configuration in which the wavelength demultiplexing unit 630 is connected to the OLTs 610 by optical fibers, the optical splitter 640 is connected to the wavelength demultiplexing unit 630 by an optical fiber, and the ONUs 520 are connected to the optical splitter 640 by optical fibers. As described above, the plurality of OLTs 610 performs communication using different wavelengths for respective ONUs 620 in the uplink direction and the downlink direction.

The OLTs 610 respectively accommodate different ONUs 620 and process optical signals demultiplexed and input by the wavelength demultiplexing unit 630.

Each OLT 610 includes an optical multiplexing/demultiplexing unit 611, an optical transmission unit 612, a management control unit 613, and an optical reception unit 614. The optical multiplexing/demultiplexing unit 611 separates an uplink signal and a downlink signal from each other. The optical transmission unit 612 converts data of an electrical signal to be transmitted into an optical signal. The management control unit 613 superimposes the AMCC signal on the main signal at the electrical stage or acquires the AMCC signal at the electrical stage. The optical reception unit 614 converts an optical signal output from the optical multiplexing/demultiplexing unit 611 into an electrical signal.

Each ONU 620 includes an optical multiplexing/demultiplexing unit 621, an optical transmission unit 622, a management control unit 623, and an optical reception unit 624. The optical multiplexing/demultiplexing unit 621 separates an uplink signal and a downlink signal from each other. The optical transmission unit 622 converts data of an electrical signal to be transmitted into an optical signal. The management control unit 623 superimposes the AMCC signal on the main signal at the electrical stage or acquires the AMCC signal at the electrical stage. The optical reception unit 624 converts an optical signal output from the optical multiplexing/demultiplexing unit 621 into an electrical signal.

CITATION LIST

Non Patent Literature

Non Patent Literature 1: "ITU-T G.989.2 Recommendation, "40-Gigabit-capable-passive optical networks (NG-PON2): Physical media dependent (PMD) layer specification," February 2019.

Non Patent Literature 2: Y. Luo, H. Roberts, K. Grobe, M. Valvo, D. Nesset, K. Asaka, H. Rohde, J. Smith, J. S. Wey, and F. Effenberger, "Physical Layer Aspects of G-PON2 Standards-Part 2: System Design and Technology Feasibility," J. Opt. Com-mun. Netw., 8(1), pp. 43-52, January 2016.

SUMMARY OF INVENTION

Technical Problem

If the AMCC signal can be used for a TDM-PON, the signal for management and control can be transmitted within the wavelength range of the wavelength used for the main signal, and thus it is not necessary to use a dedicated optical wavelength range. Further, it is not necessary to embed the signal for management and control in the main signal, and transmission efficiency of the main signal can be increased. The AMCC signal is a low-speed signal on the order of kilo bit/sec (kb/s) (see, for example, Non Patent Literature 2). On the other hand, a signal of the TDM-PON is a high-speed signal on the order of Giga bit/sec (Gb/s). In the uplink direction of the TDM-PON, burst signals are exchanged between the OLTs and the ONUs for controlling transmission timings so that frames from respective ONUs do not collide with each other. The frame length of the low-speed AMCC signal is expected to be significantly longer than the frame length of the high-speed burst signal, and it has been difficult to superimpose the AMCC signal that is the management control signal on the burst signal. For that reason, there has been a problem that the management control signal cannot be used in the TDM-PON. Such a problem is not limited to the TDM-PON, and is a problem common to at least systems in general in which time division multiplexing is performed.

In view of the above circumstances, an object of the present invention is to provide a technology capable of using the management control signal in the systems in which time division multiplexing is performed.

Solution to Problem

One aspect of the present invention is an optical communication device that communicates with another optical communication device by using at least a time division multiplexing system, the optical communication device including: a management control signal division unit that divides a management control signal used for management and control; and a transmission unit that transmits the management control signal divided, by including the management control signal divided in a burst signal to be transmitted at an assigned transmission timing.

One aspect of the present invention is an optical communication device that communicates with another optical communication device by using at least a time division multiplexing system, the optical communication device including: a signal extraction unit that extracts divided management control signals divided used for management and control, the divided management control signals being included in a burst signal transmitted from the another optical communication device; and an integration unit that integrates the divided management control signals and restores a management control signal.

One aspect of the present invention is an optical access system that performs communication between a first optical communication device and a second optical communication device by using at least a time division multiplexing system, in which the first optical communication device includes: a management control signal division unit that divides a management control signal used for management and control; and a transmission unit that transmits the management control signal divided, by including the management control signal divided in a burst signal to be transmitted at an assigned transmission timing, and the second optical communication device includes: a signal extraction unit that extracts the management control signal divided included in the burst signal transmitted from the first optical communication device; and an integration unit that integrates the management control signal divided to restore the management control signal.

One aspect of the present invention is an optical communication method performed by an optical communication device that communicates with another optical communication device by using at least a time division multiplexing system, the optical communication method including: dividing a management control signal used for management and control; and transmitting the management control signal divided, by including the management control signal divided in a burst signal to be transmitted at an assigned transmission timing.

Advantageous Effects of Invention

According to the present invention, the management control signal can be used in the systems in which time division multiplexing is performed.

DESCRIPTION OF EMBODIMENTS

Hereinafter, an embodiment of the present invention will be described with reference to the drawings.
(Overview)

In an optical access system in the present invention, as an example, when superimposing an AMCC signal on an uplink burst signal in a TDM-PON, an ONU divides the AMCC signal in accordance with an instruction of a received gate frame, and then superimposes the AMCC signal divided on the burst signal. As a result, the AMCC signal can be superimposed on the burst signal. As a result, the AMCC signal can be used in the TDM-PON.

Hereinafter, details will be described.

First Embodiment

Figure 1:
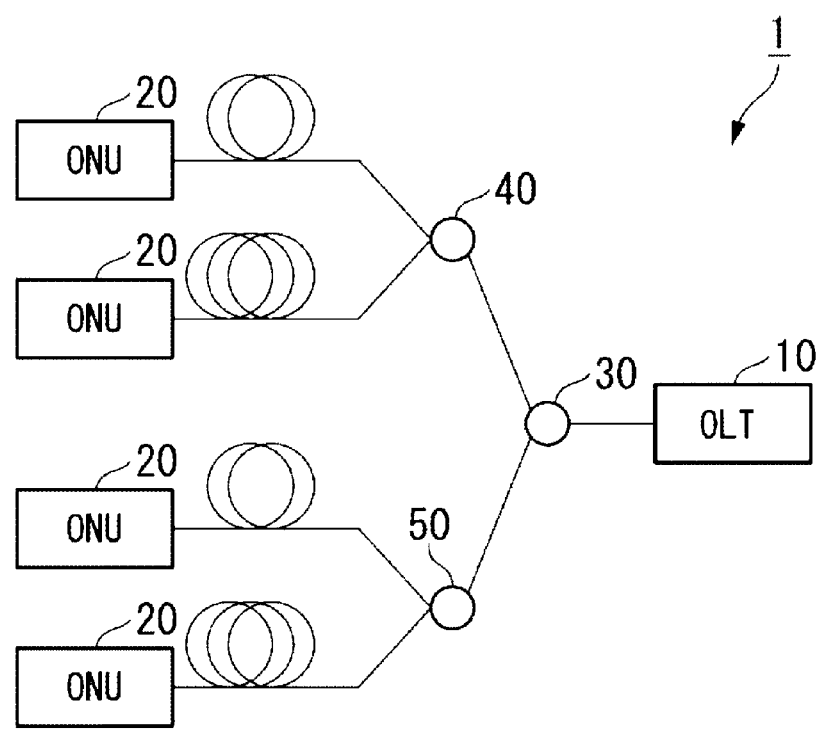
FIG. 1 is a diagram illustrating an example configuration of an optical access system in a first embodiment.

FIG. 1 is a diagram illustrating an example configuration of an optical access system 1 in a first embodiment.

The optical access system 1 includes an OLT 10 and one or more ONUs 20. The OLT 10 and the ONUs 20 are connected to each other by one or more optical splitters 30, 40, and 50, and optical fibers. FIG. 1 illustrates a configuration in which the optical splitter 30 is connected to the OLT 10 by an optical fiber, the optical splitters 40 and 50 are connected to the optical splitter 30 by optical fibers, and two each of the ONUs 20 are connected to the optical splitters 40 and 50 by optical fibers. Hereinafter, a direction from the OLT 10 to each ONU 20 is referred to as a downlink direction, and a direction from the ONU 20 to the OLT 10 is referred to as an uplink direction.

The configuration illustrated in FIG. 1 is an example, and the number of the ONUs 10, the ONUs 20, and the optical splitters included in the optical access system 1 is not particularly limited. In the optical access system 1, a description will be given assuming that communication is performed between the OLT 10 and the ONU 20 by a TDM-PON system. It is assumed that the optical access system 1 uses a "low-frequency pilot tone" that superimposes an AMCC signal on a main signal at the electrical stage.

The OLT 10 performs bandwidth assignment for the ONU 20. Specifically, the OLT 10 assigns a transmission timing and an amount of transmission of data for each ONU 20. The transmission timing of the data indicates a timing at which the OLT 10 starts transmission of the main signal. The amount of transmission represents an amount of data that can be transmitted by the OLT 10 in one transmission.

The ONU 20 performs data transmission to the OLT 10 on the basis of the transmission timing and the amount of transmission assigned from the OLT 10. The ONU 20 generates the AMCC signal to be transmitted to the OLT 10, divides the generated AMCC signal, and superimposes the divided AMCC signal on the main signal. For example, the ONU 20 divides the AMCC signal within a range falling within the amount of transmission, and superimposes an AMCC signal divided on the main signal to generate transmission data. Dividing the AMCC signal means dividing one AMCC signal into a plurality of signals. For example, it means that the AMCC signal is divided into signals having a size falling within the amount of transmission in order from the head. In the following description, the AMCC signal after division is referred to as a divided AMCC signal.

The optical splitter 30 splits the optical signal transmitted from the OLT 10 and outputs optical signals to the optical splitters 40 and 50. The optical splitter 30 outputs optical signals output from the optical splitters 40 and 50 to the OLT 10.

The optical splitters 40 and 50 output optical signals transmitted from the OLT 10 to the optical splitter 30. The optical splitters 40 and 50 splits the optical signals output from the optical splitter 30 and output optical signals to the ONUs 20.

Figure 2:
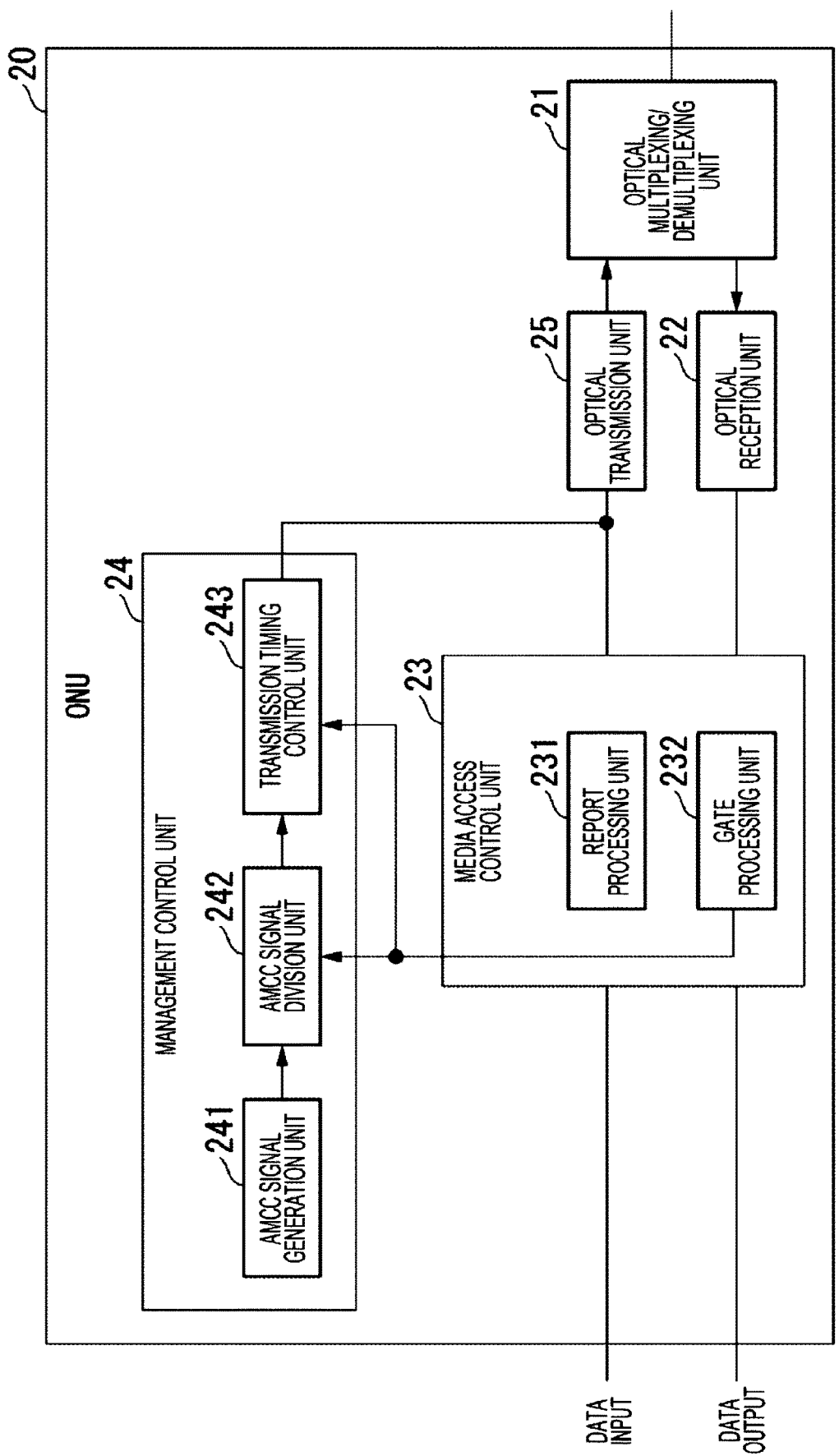
FIG. 2 is a diagram illustrating a configuration of an ONU in the first embodiment.

FIG. 2 is a diagram illustrating a configuration of the ONU 20 in the first embodiment.

The ONU 20 includes an optical multiplexing/demultiplexing unit 21, an optical reception unit 22, a media access control unit 23, a management control unit 24, and an optical transmission unit (transmitter) 25.

The optical multiplexing/demultiplexing unit 21 separates an uplink signal and a downlink signal from each other.

The optical reception unit 22 includes therein an optical/electrical (O/E) converter such as a photodetector. The optical reception unit 22 receives an optical signal via the optical multiplexing/demultiplexing unit 21, converts the received optical signal into an electrical signal by the O/E converter, and outputs the electrical signal to the media access control unit 23. The optical reception unit 22 receives a gate frame transmitted from the OLT 10, for example. The gate frame includes an instruction of a transmission timing and an amount of transmission so that the plurality of ONUs 20 can transmit data without causing collision temporally.

The media access control unit 23 processes the gate frame transmitted from the OLT 10 and generates a report frame for bandwidth request to the OLT 10. The media access control unit 23 includes a report processing unit (report processor) 231 and a gate processing unit 232.

The report processing unit 231 generates the report frame. The report frame is a frame for notifying the OLT 10 of the amount of data waiting to be transmitted accumulated in the buffer of the ONU 20.

The gate processing unit 232 acquires information on the transmission timing and the amount of transmission included in the gate frame. The gate processing unit 232 outputs the information on the transmission timing and the amount of transmission acquired to the management control unit 24. Here, for the sake of simplicity, the amount of transmission does not include an amount of transmission of the main signal including an inter frame gap (IFG). Further, the transmission timing does not include a time required for turning on or off a laser included in the optical transmission unit 25 and a time related to automatic gain control (AGC) and clock data recovery (CDR) in the optical reception unit 22.

The management control unit 24 performs processing related to superimposition of the AMCC signal. The management control unit 24 includes an AMCC signal generation unit 241, an AMCC signal division unit (management control signal divider) 242, and a transmission timing control unit (transmission timing controller) 243.

The AMCC signal generation unit 241 generates the AMCC signal. Items to be managed and controlled by the AMCC signal are control information, monitoring information, and the like of a transmission wavelength defined in ITU-T G.989.2 Recommendation.

The AMCC signal division unit 242 acquires the information on the amount of transmission output from the gate processing unit 232. The AMCC signal division unit 242 divides the AMCC signal generated by the AMCC signal generation unit 241 within a range not exceeding the amount of transmission on the basis of the amount of transmission. The AMCC signal division unit 242 adds identification information including division identification information and transmission source user information for each divided AMCC signal. A position to which the division identification information and the transmission source user information are added may be the head or the tail of the divided AMCC signal. The division identification information is identification information indicating that the AMCC signal is divided. For example, the division identification information may be divided onto identification information indicating that the division is in progress and division identification information indicating the end of the division, or may include information indicating the order of transmission. Note that the AMCC signal division unit 242 may add only the transmission source user information to the divided AMCC signal without using the division identification information. The transmission source user information is information indicating a transmission source of the AMCC signal, and is, for example, identification information of the ONU 20.

The transmission timing control unit 243 acquires information on the transmission timing output from the gate processing unit 232. The transmission timing control unit 243 superimposes the divided AMCC signal on the main signal in accordance with a transmission start time of the burst signal on the basis of the acquired information on the transmission timing.

The ONU 20 transmits uplink data at a designated time in accordance with the instruction of the received gate frame. The optical transmission unit 25 includes therein a light source that emits light for data transmission. The optical transmission unit 25 modulates the light emitted by the light source included therein on the basis of an electrical signal of the main signal on which the divided AMCC signal is superimposed to convert the light into an uplink optical signal (burst signal), and sends out the converted uplink optical signal to the optical fiber.

Figure 3:
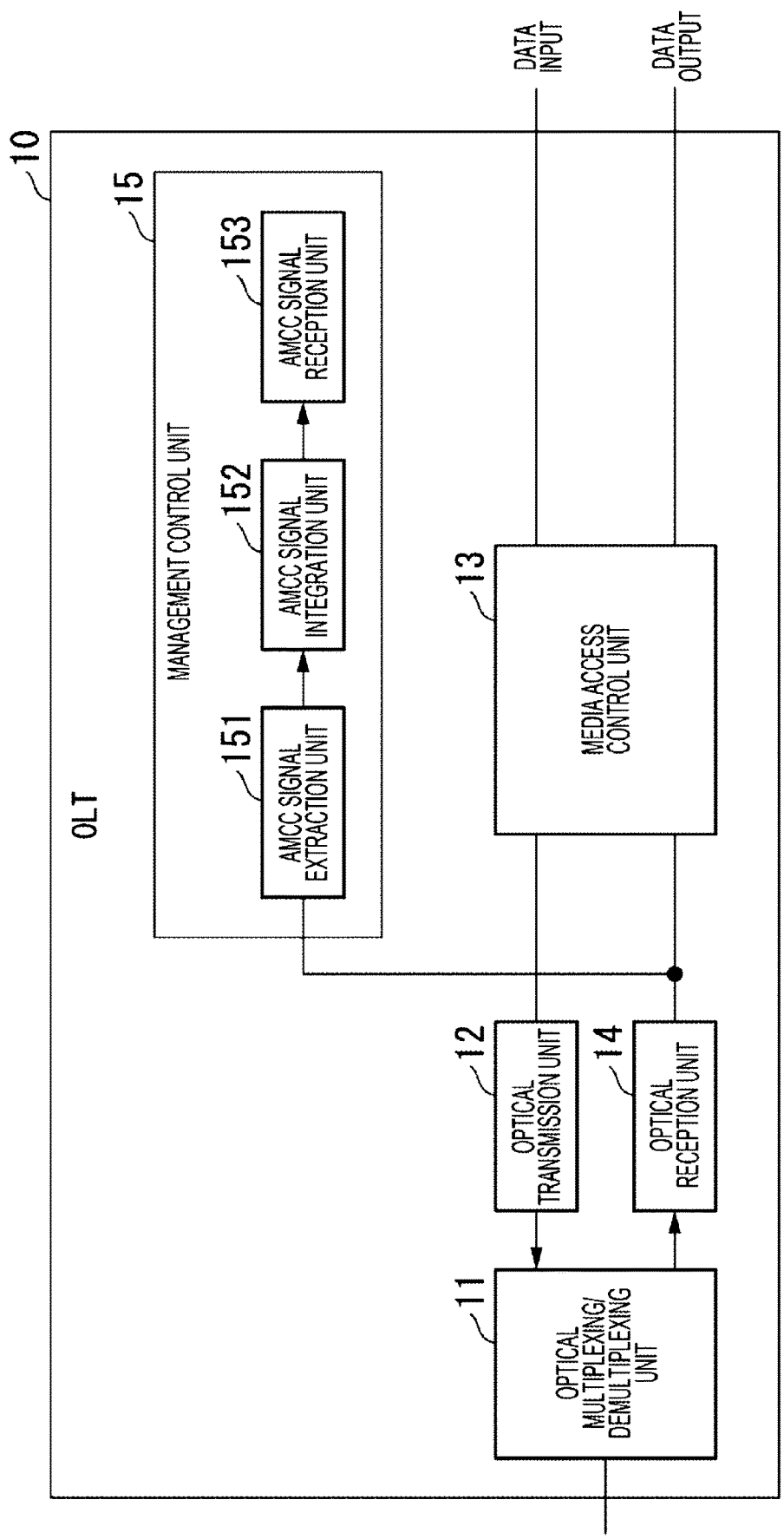
FIG. 3 is a diagram illustrating a configuration of an OLT in the first embodiment.

FIG. 3 is a diagram illustrating a configuration of the OLT 10 in the first embodiment.

The OLT 10 includes an optical multiplexing/demultiplexing unit 11, an optical transmission unit 12, a media access control unit 13, an optical reception unit 14, and a management control unit 15.

The optical multiplexing/demultiplexing unit 11 separates an uplink signal and a downlink signal from each other.

The optical transmission unit 12 includes therein a light source that emits light for data transmission. The optical transmission unit 12 modulates light emitted by the light source included therein on the basis of the electrical signal of the main signal to convert the light into an optical signal, and sends out the converted optical signal to an optical fiber.

The media access control unit 13 schedules a transmission timing and an amount of transmission for each OLT 10 on the basis of the report frame transmitted from the ONU 20, and generates the gate frame.

The optical reception unit 14 includes therein an O/E converter such as a photodetector. The optical reception unit 14 receives an optical signal via the optical multiplexing/demultiplexing unit 11, converts the received optical signal into an electrical signal by the O/E converter, and outputs the electrical signal to the media access control unit 23 and the management control unit 15. The optical reception unit 14 receives, for example, an optical signal on which the report frame and the divided AMCC signal transmitted from the ONU 20 are superimposed.

The management control unit 15 performs processing related to acquisition of the AMCC signal. The management control unit 15 includes an AMCC signal extraction unit (signal extractor) 151, an AMCC signal integration unit (integrator) 152, and an AMCC signal reception unit 153.

The AMCC signal extraction unit 151 demodulates the divided AMCC signal superimposed on the main signal by signal processing or the like.

The AMCC signal integration unit 152 integrates the divided AMCC signal demodulated by the AMCC signal extraction unit 151. Integrating the divided AMCC signal means restoring one AMCC signal by combining a plurality of divided AMCC signals. Note that, in a case where the division identification information is included in the divided AMCC signal, the AMCC signal integration unit 152 restores the AMCC signal by arranging the divided AMCC signals in order. In a case where the division identification information is not included in the divided AMCC signal, the AMCC signal integration unit 152 restores the AMCC signal by arranging the divided AMCC signals in order of acquisition.

The AMCC signal reception unit 153 performs management and control on the basis of the restored AMCC signal.

Figure 4:
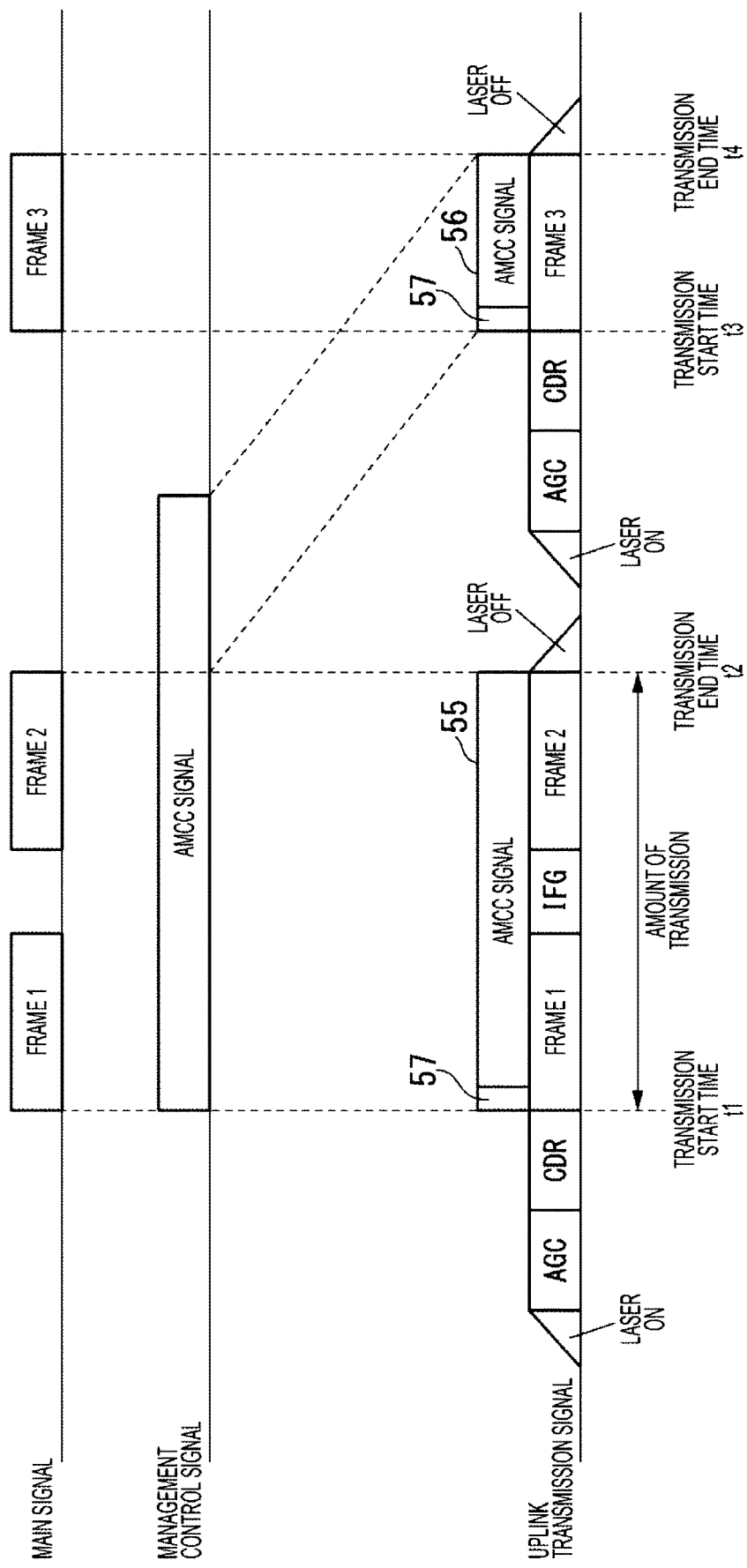
FIG. 4 is a diagram for explaining processing for transmitting an AMCC signal in the first embodiment.

FIG. 4 is a diagram for explaining processing for transmitting an AMCC signal in the first embodiment.

FIG. 4 illustrates a case where the ONU 20 transmits main signals of frames 1 to 3. The ONU 20 transmits the frame 1 and the frame 2 at a first transmission timing between time t1 and time t2, and transmits the frame 3 at a second transmission timing between time t3 and time t4. First, the ONU 20 divides the AMCC signal so that divided signals fall within a range of the amount of transmission that can be transmitted at the first transmission timing. As a result, divided AMCC signals 55 and 56 are generated. Note that identification information 57 is added to the divided AMCC signals 55 and 56.

Then, before the time t1, the ONU 20 turns on the laser of the optical transmission unit 25 to perform AGC and CDR processing, and superimposes the divided AMCC signal 55 on the main signals of the frame 1 and the frame 2. At the time t1, the ONU 20 sends out an optical signal obtained by superimposing the divided AMCC signal 55 on the main signals of the frame 1 and the frame 2. Thereafter, the ONU 20 once turns off the laser and waits until the next transmission timing (for example, transmission start time t3). Before the time t3, the ONU 20 turns on the laser of the optical transmission unit 25 to perform AGC and CDR processing, and superimposes the divided AMCC signal 56 on the main signal of the frame 3. At the time t3, the ONU 20 sends out an optical signal obtained by superimposing the divided AMCC signal 56 on the main signal of the frame 3. Thereafter, the ONU 20 once turns off the laser and waits until the next transmission timing.

As described above, the ONU 20 divides the AMCC signal, and superimposes the divided AMCC signal on the main signal by the amount of transmission for which the instruction is given, from a transmission start time of the main signal in an uplink transmission signal.

Figure 5:
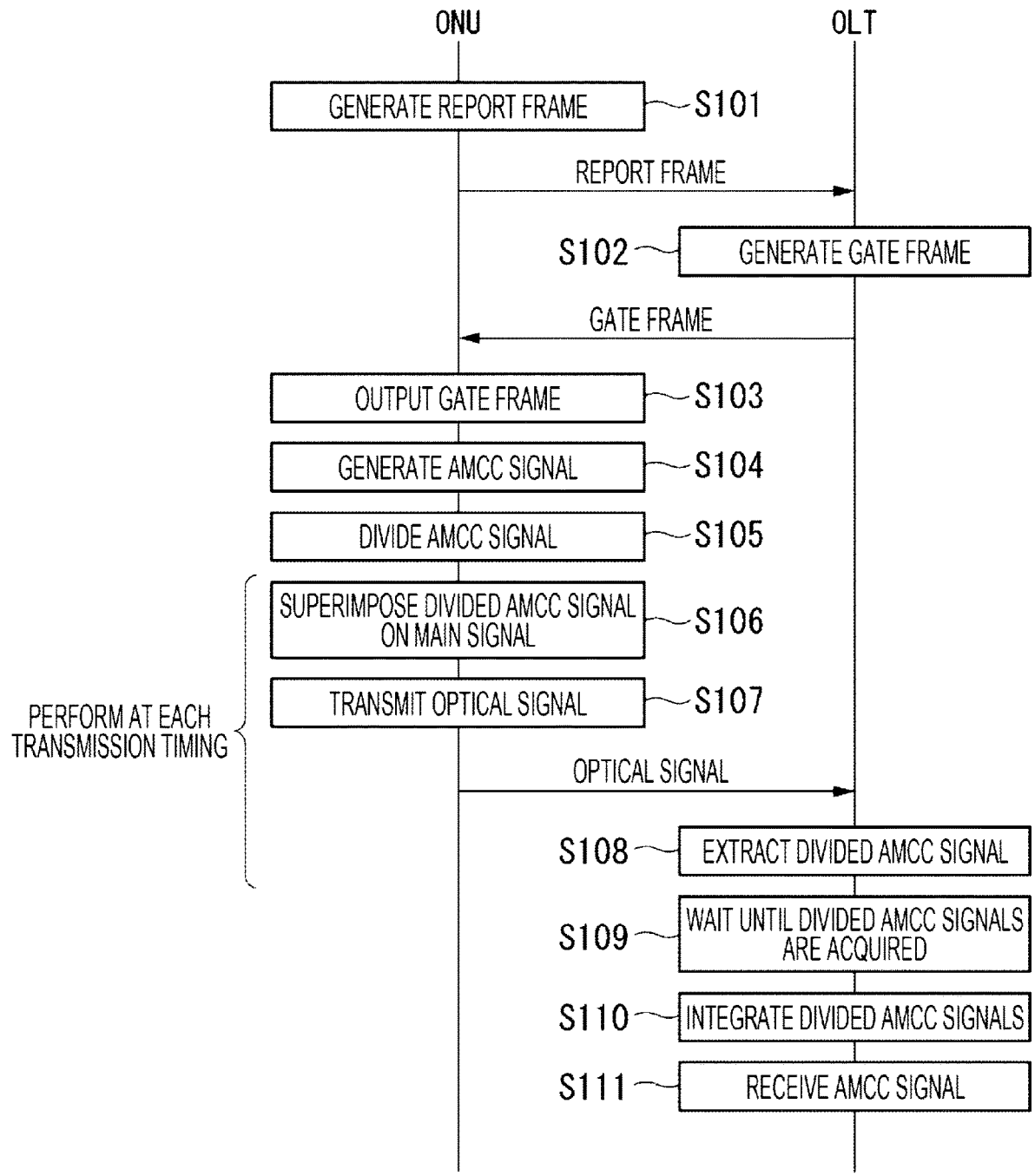
FIG. 5 is a sequence diagram illustrating a flow of processing performed by the optical access system in the first embodiment.

FIG. 5 is a sequence diagram illustrating a flow of processing performed by the optical access system 1 in the first embodiment. At the start of the processing of FIG. 5, it is assumed that data to be transmitted is accumulated in a buffer in the ONU 20. In the processing of FIG. 5, the optical splitter will be omitted from the description.

The report processing unit 231 generates a report frame on the basis of the amount of data waiting to be transmitted accumulated in the buffer (step S101). The report processing unit 231 outputs the generated report frame to the optical transmission unit 25. The optical transmission unit 25 converts the report frame into an optical signal and transmits the optical signal to the OLT 10.

The optical multiplexing/demultiplexing unit 11 of the OLT 10 outputs the uplink optical signal input via the optical fiber to the optical reception unit 14. The optical reception unit 14 converts the optical signal input via the optical multiplexing/demultiplexing unit 11 into an electrical signal and outputs the electrical signal to the media access control unit 13. The media access control unit 13 schedules the transmission timing and the amount of transmission on the basis of the report frame, and generates a gate frame including information on the assigned transmission timing and amount of transmission (step S102). The media access control unit 13 outputs the generated gate frame to the optical transmission unit 12. The optical transmission unit 12 converts the gate frame into an optical signal and transmits the optical signal to the ONU 20.

The optical multiplexing/demultiplexing unit 21 of the ONU 20 outputs the downlink optical signal input via the optical fiber to the optical reception unit 22. The optical reception unit 22 converts the optical signal input via the optical multiplexing/demultiplexing unit 21 into an electrical signal and outputs the electrical signal to the media access control unit 23 (step S103). Note that, in a case where the optical signal is not addressed to the ONU 20, the optical reception unit 22 discards the input optical signal. The gate processing unit 232 acquires the gate frame of the electrical signal output from the optical reception unit 22. The gate processing unit 232 outputs the information on the amount of transmission included in the gate frame acquired to the AMCC signal division unit 242, and outputs the information on the transmission timing to the transmission timing control unit 243.

The AMCC signal generation unit 241 generates the AMCC signal (step S104). The AMCC signal generation unit 241 outputs the generated AMCC signal to the AMCC signal division unit 242. The AMCC signal division unit 242 divides the AMCC signal output from the AMCC signal generation unit 241 depending on the amount of transmission (step S105). Specifically, the AMCC signal division unit 242 divides the AMCC signal so that divided signals have sizes not exceeding the amount of transmission. As a result, the AMCC signal division unit 242 generates divided AMCC signals. The AMCC signal division unit 242 adds identification information to the generated divided AMCC signals. The AMCC signal division unit 242 outputs the divided AMCC signals to the transmission timing control unit 243.

The transmission timing control unit 243 superimposes the divided AMCC signals on the main signal in accordance with the transmission start time on the basis of the acquired information on the transmission timing (step S106). At this time, the transmission timing control unit 243 superimposes one divided AMCC signal at one transmission timing. The main signal on which the divided AMCC signal is superimposed is input to the optical transmission unit 25. The optical transmission unit 25 generates an optical signal by modulating the light output from the light source with the main signal on which the divided AMCC signal is superimposed. The optical transmission unit 25 transmits the generated optical signal to the OLT 10 (step S107).

The optical multiplexing/demultiplexing unit 11 of the ONU 20 outputs the uplink optical signal input via the optical fiber to the optical reception unit 14. The optical reception unit 14 converts the optical signal input via the optical multiplexing/demultiplexing unit 11 into an electrical signal. The AMCC signal extraction unit 151 extracts the divided AMCC signal from the electrical signal converted by the optical reception unit 14 (step S108). The AMCC signal extraction unit 151 outputs the extracted divided AMCC signal to the AMCC signal integration unit 152. At present, there is only one divided AMCC signal. In this case, the AMCC signal integration unit 152 cannot restore the AMCC signal.

The processing from step S106 to step S108 is repeatedly executed at each transmission timing. For example, the processing from step S106 to step S108 is repeatedly executed at each transmission timing until the ONU 20 finishes transmitting the divided AMCC signal.

The AMCC signal integration unit 152 waits until all the divided AMCC signals are acquired (step S109). For example, in a case where the division identification information is added to the divided AMCC signal, the AMCC signal integration unit 152 waits to perform the processing until the divided AMCC signal to which the division identification information indicating the end of the division is added is acquired. In a case where the division identification information is not added to the divided AMCC signal, the AMCC signal integration unit 152 waits to perform the processing until the divided AMCC signals for a predetermined period is acquired. The predetermined period may be preset, or may be a period calculated on the basis of the amount of transmission assigned to the ONU 20 and the frame length of the AMCC signal. For example, by dividing the frame length of the AMCC signal by the amount of transmission, it can be seen how many times the divided AMCC signal is transmitted at maximum. Thus, the AMCC signal integration unit 152 may wait for a period for the maximum number of times of transmission of the divided AMCC signal.

When all the divided AMCC signals of the ONU 20 identified by the transmission source user information are acquired, the AMCC signal integration unit 152 integrates the acquired plurality of divided AMCC signals (step S110). As a result, the AMCC signal is restored. The AMCC signal integration unit 152 outputs the restored AMCC signal to the AMCC signal reception unit 153. The AMCC signal reception unit 153 receives the restored AMCC signal (step S111). Thereafter, the AMCC signal reception unit 153 performs management and control on the basis of the received AMCC signal.

According to the optical access system 1 in the first embodiment configured as described above, the AMCC signal can be used in the TDM-PON. Specifically, the ONU 20 divides the AMCC signal in accordance with the amount of transmission included in the gate frame transmitted from the OLT 10. The ONU 20 superimposes the divided AMCC signal on the main signal at each transmission timing included in the gate frame. As a result, the AMCC signal can be superimposed on the burst signal. For that reason, the AMCC signal can be used in the TDM-PON.

Further, since the AMCC signal can be superimposed on the main signal and transmitted within the wavelength range of the wavelength used for the main signal, an optical wavelength range for monitoring control does not have to be used. For that reason, it is not necessary to embed a signal for management and control in the main signal, so that transmission efficiency of the main signal can be increased.

Second Embodiment

In the first embodiment, the description has been given on the premise that there is data (main signal) to be transmitted in an ONU. On the other hand, it is also assumed that there is no data to be transmitted in the ONU, but it is desired to transmit an AMCC signal. Thus, in a second embodiment, a description will be given of a configuration in which the ONU has no data to be transmitted but transmits the AMCC signal.

In the second embodiment, a basic system configuration is equivalent to that of the first embodiment. A difference from the first embodiment is a configuration of the ONU. Thus, the ONU will be described below.

Figure 6:
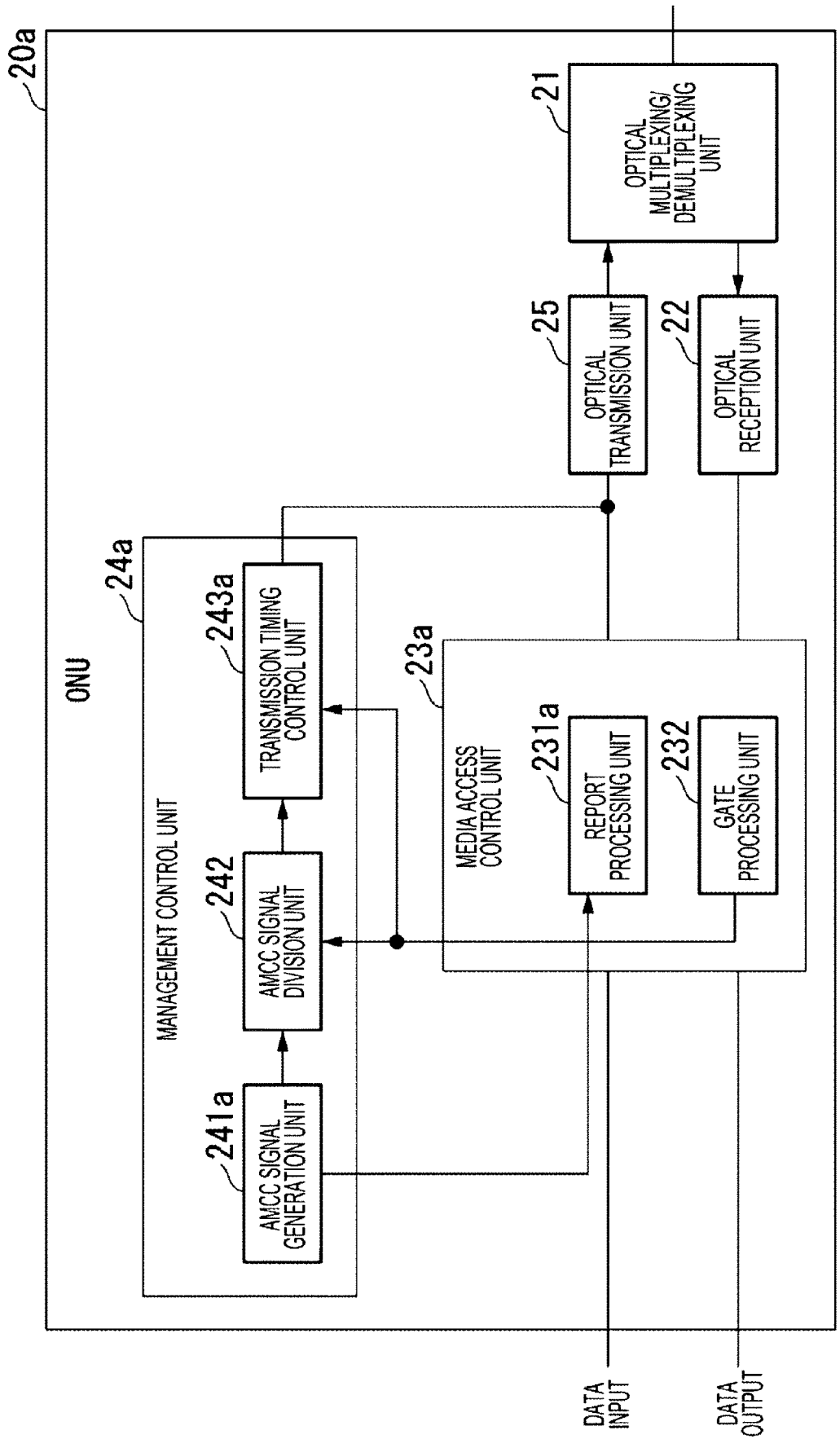
FIG. 6 is a diagram illustrating a configuration of an ONU in a second embodiment.

FIG. 6 is a diagram illustrating a configuration of an ONU 20*a* in the second embodiment.

The ONU 20*a* includes an optical multiplexing/demultiplexing unit 21, an optical reception unit 22, a media access control unit 23*a*, a management control unit 24*a*, and an optical transmission unit 25.

The ONU 20*a* is different from the ONU 20 in that the media access control unit 23*a* and the management control unit 24*a* are included instead of the media access control unit 23 and the management control unit 24. The ONU 20*a* is similar to the ONU 20 for other components. For that reason, a description of the entire ONU 20*a* will be omitted, and the media access control unit 23*a* and the management control unit 24*a* will be described.

The media access control unit 23*a* includes a report processing unit 231*a* and a gate processing unit 232.

The report processing unit 231*a* generates a report frame. The report processing unit 231*a* in the second embodiment compares an amount of transmission request for which an instruction is given from an AMCC signal generation unit 241*a* with an amount of data of the main signal accumulated in a buffer of the ONU 20*a*, and generates the report frame including a larger value of the amounts or a value obtained by multiplying the larger value of the amounts by a coefficient. Not that, in a case where there is no main signal accumulated in the buffer of the ONU 20*a*, the amount of data of the main signal is 0.

The ONU 20*a* generates and transmits a dummy pattern at a designated time in accordance with an instruction of a received gate frame.

The management control unit 24*a* performs processing related to superimposition of the AMCC signal. The management control unit 24*a* includes the AMCC signal generation unit 241*a*, an AMCC signal division unit 242, and a transmission timing control unit 243*a*.

The AMCC signal generation unit 241*a* gives an instruction to generate the report frame before generation of the AMCC signal. The instruction to generate the report frame includes information on the amount of transmission request for transmitting the AMCC signal.

The transmission timing control unit 243*a* acquires information on a transmission timing output from the gate processing unit 232. The transmission timing control unit 243*a* superimposes a divided AMCC signal on the dummy pattern in accordance with a transmission start time of the burst signal on the basis of the acquired information on the transmission timing.

The optical transmission unit 25 includes therein a light source that emits light for data transmission. The optical transmission unit 25 modulates the light emitted by the light source included therein on the basis of an electrical signal of the dummy pattern on which the divided AMCC signal is superimposed to convert the light into an uplink optical signal (burst signal), and sends out the converted uplink optical signal to an optical fiber.

Figure 7:
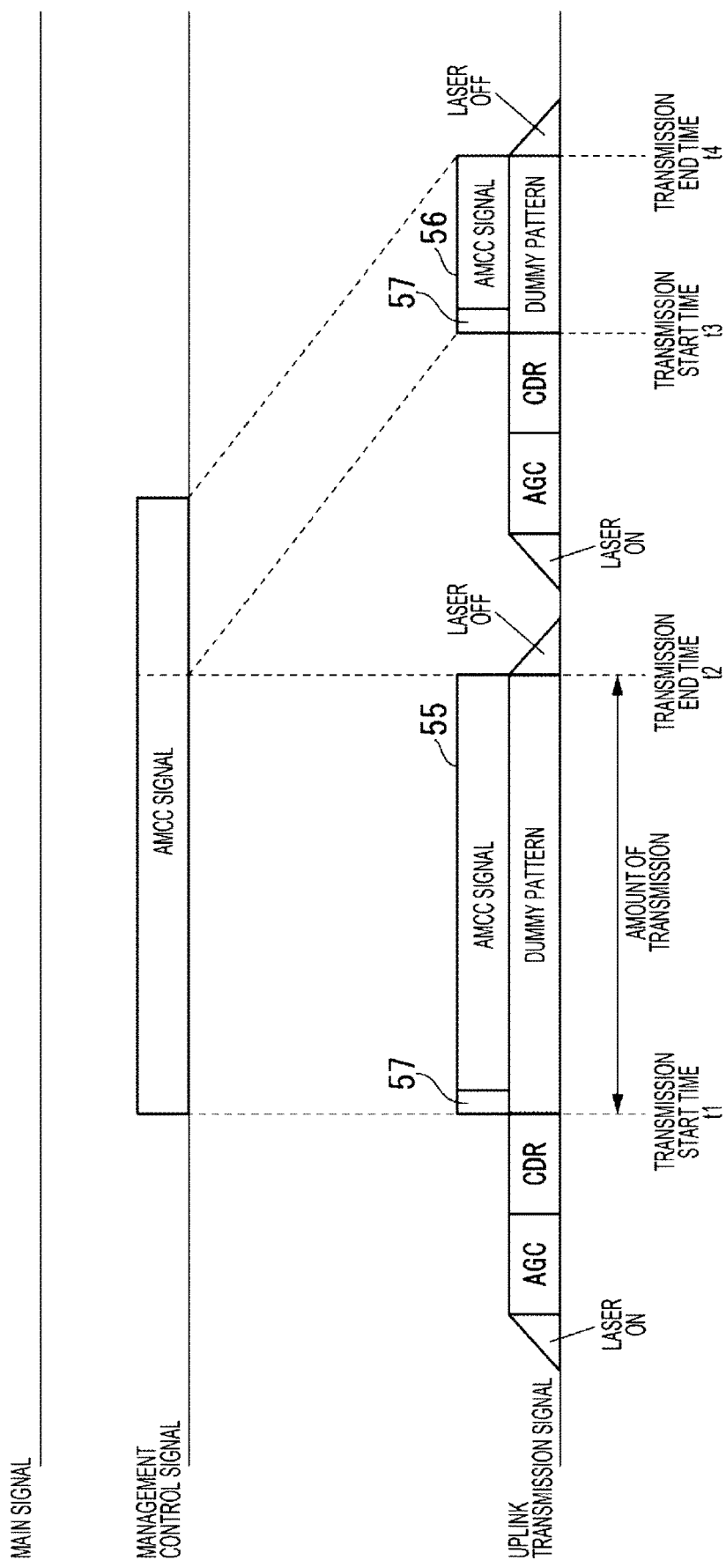
FIG. 7 is a diagram for explaining processing for transmitting an AMCC signal in the second embodiment.

FIG. 7 is a diagram for explaining processing for transmitting the AMCC signal in the second embodiment.

FIG. 7 illustrates a case where the ONU 20*a* has no main signal to transmit. On the other hand, the amount of transmission and the transmission timing are assigned from the OLT 10 by the report frame generated by the report processing unit 231*a*. Thus, the ONU 20*a* superimposes the divided AMCC signal on the dummy pattern for the amount of transmission assigned and transmits them at a first transmission timing between time t1 and time t2, and superimposes the untransmitted divided AMCC signal on the dummy pattern and transmits them at the second transmission timing between time t3 and time t4. First, the ONU 20*a* divides the AMCC signal so that divided signals fall within a range of the amount of transmission that can be transmitted at the first transmission timing. As a result, divided AMCC signals 55 and 56 are generated. Note that identification information 57 is added to the divided AMCC signals 55 and 56.

Then, before the time t1, the ONU 20*a* turns on the laser of the optical transmission unit 25 to perform AGC and CDR processing, and superimposes the divided AMCC signal 55 on the dummy pattern. At the time t1, the ONU 20*a* sends out an optical signal generated by modulating the light from the light source with an electrical signal obtained by superimposing the divided AMCC signal 55 on the dummy pattern. Thereafter, the ONU 20*a* once turns off the laser and waits until the next transmission timing (for example, transmission start time t3). Before the time t3, the ONU 20*a* turns on the laser of the optical transmission unit 25 to perform AGC and CDR processing, and superimposes the divided AMCC signal 56 on the dummy pattern. At the time t3, the ONU 20*a* sends out an optical signal generated by modulating the light from the light source with an electrical signal obtained by superimposing the divided AMCC signal 56 on the dummy pattern. Thereafter, the ONU 20*a* once turns off the laser and waits until the next transmission timing.

As described above, the ONU 20*a* divides the AMCC signal, and transmits the divided AMCC signal by the amount of transmission for which the instruction is given, from the transmission start time of the main signal in an uplink transmission signal.

Figure 8:
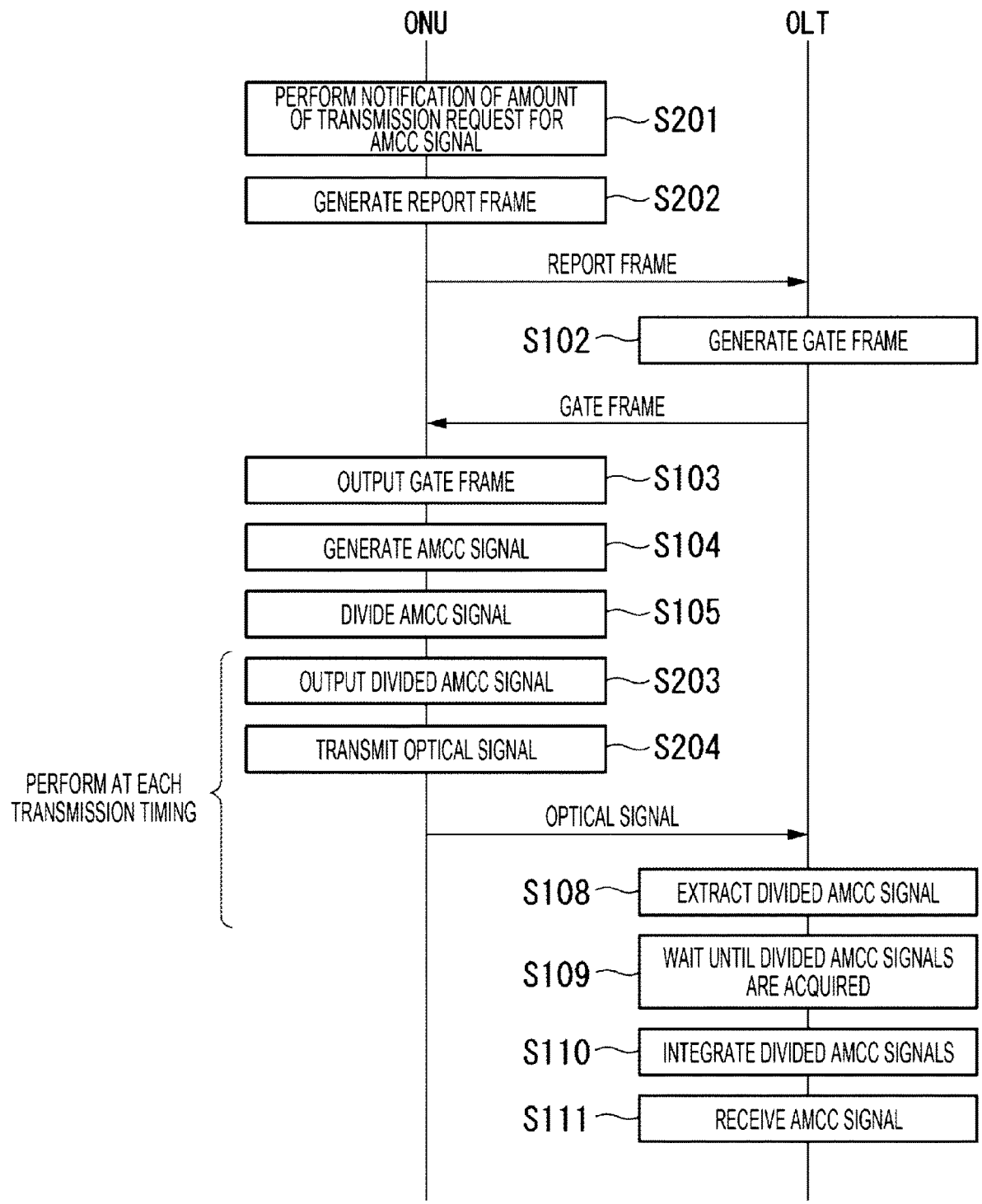
FIG. 8 is a sequence diagram illustrating a flow of processing performed by an optical access system in the second embodiment.

FIG. 8 is a sequence diagram illustrating a flow of processing performed by an optical access system 1 in the second embodiment. In FIG. 8, the same processing steps as those in FIG. 5 are denoted by the same reference numerals as those in FIG. 5, and description thereof is omitted.

Before generating the AMCC signal, the AMCC signal generation unit 241*a* notifies the report processing unit 231*a* of the information on the amount of transmission request for transmitting the AMCC signal, thereby giving the instruction to generate the report frame (step S201). The report processing unit 231a generates the report frame in response to the instruction from the AMCC signal generation unit 241a (step S202).

Specifically, first, the report processing unit 231a compares the amount of transmission request for which the instruction is given from the AMCC signal generation unit 241a with the amount of data of the main signal accumulated in the buffer of the ONU 20aa. Then, as a result of the comparison, the report processing unit 231a generates a report frame including the amount of transmission request and a larger value of the amounts or a value obtained by multiplying the larger value of the amounts by a coefficient. The report processing unit 231a outputs the generated report frame to the optical transmission unit 25. The optical transmission unit 25 converts the report frame into an optical signal and transmits the optical signal to the OLT 10.

Thereafter, the processing from step S102 to step S105 is executed. The transmission timing control unit 243a superimposes the divided AMCC signal on the dummy pattern in accordance with the transmission start time on the basis of the acquired information on the transmission timing and outputs them to the optical transmission unit 25 (step S203). The divided AMCC signal superimposed on the dummy pattern output from the transmission timing control unit 243a is input to the optical transmission unit 25. The optical transmission unit 25 generates an optical signal by modulating the light output from the light source with the divided AMCC signal superimposed on the dummy pattern. The optical transmission unit 25 transmits the generated optical signal to the OLT 10 (step S204). Thereafter, the processing in step S108 and subsequent steps is executed.

With the optical access system 1 in the second embodiment configured as described above, the same effects as those of the first embodiment can be obtained.

Further, with the optical access system 1 in the second embodiment, the report frame is generated in the report processing unit 231a and the bandwidth request is performed to the OLT 10, so that the information on the amount of transmission and the transmission timing is assigned from the OLT 10 even in a case where there is no data of the main signal. For that reason, the divided AMCC signal can be transmitted to the OLT 10.

Modifications of the first embodiment and the second embodiment will be described.

In the first embodiment and the second embodiment, the configuration has been described that uses the "low-frequency pilot tone" in which the OLT 10 and the ONUs 20 and 20a perform the processing (for example, superimposition or separation) on the AMCC signal at the electrical stage on both the transmission side and the reception side; however, the "baseband modulation" may be used in which the processing (for example, superimposition or separation) on the AMCC signal is performed at the optical stage on both the transmission side and the reception side. Further, a configuration may be adopted in which processing on the AMCC signal is performed at the optical stage on the transmission side, and separation of the AMCC signal is performed at the electrical stage on the reception side, or a configuration may be adopted in which processing on the AMCC signal is performed at the electrical stage on the transmission side, and separation of the AMCC signal is performed at the optical stage on the reception side.

Topology of the OLT 10 and the ONUs 20 and 20a in the first embodiment and the second embodiment is not limited to a passive double star type, and may be a bus type or a ring type.

In the first embodiment and the second embodiment, the description has been given assuming that communication is performed between the OLT 10 and the ONUs 20 and 20a by the TDM-PON system; however, a configuration may be adopted in which various division multiplexing technologies such as wavelength division multiplexing, code division multiplexing, and frequency division multiplexing may be combined with the TDM, not limited to the TDM-PON.

Figure 9:
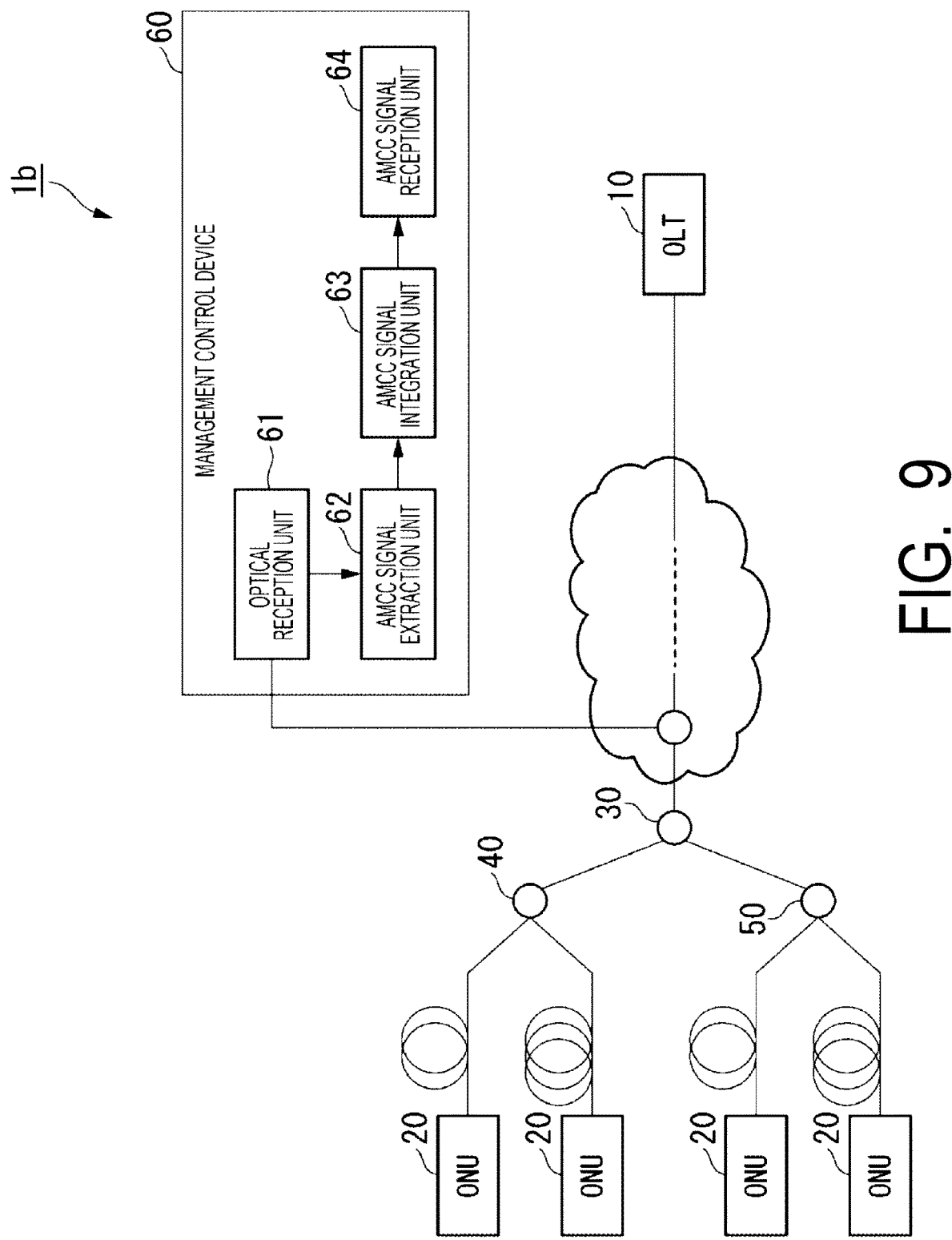
FIG. 9 is a diagram illustrating an example configuration of an optical access system in a modification.
Figure 10:
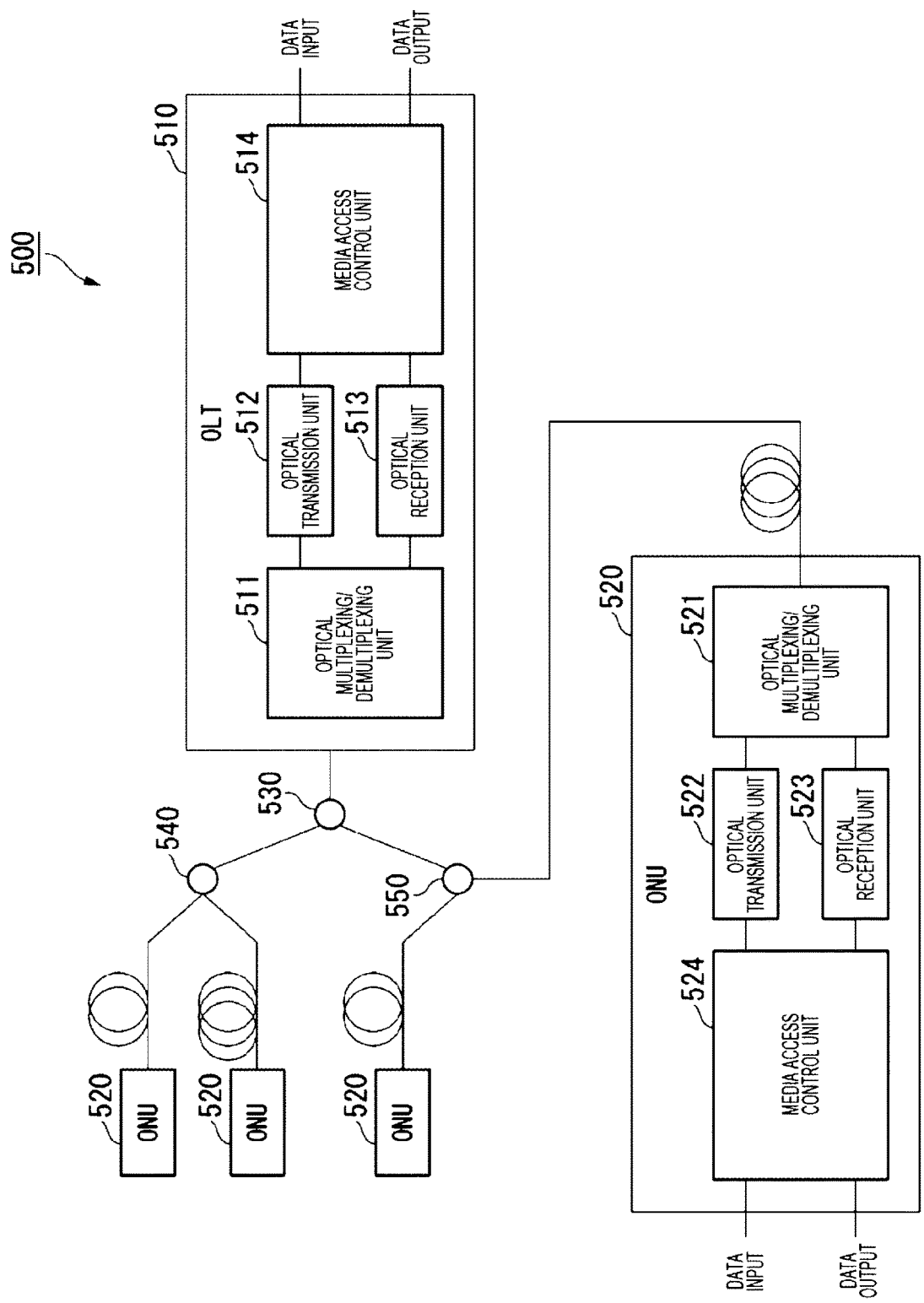
FIG. 10 is a diagram illustrating a configuration of a conventional TDM-PON system.
Figure 11:
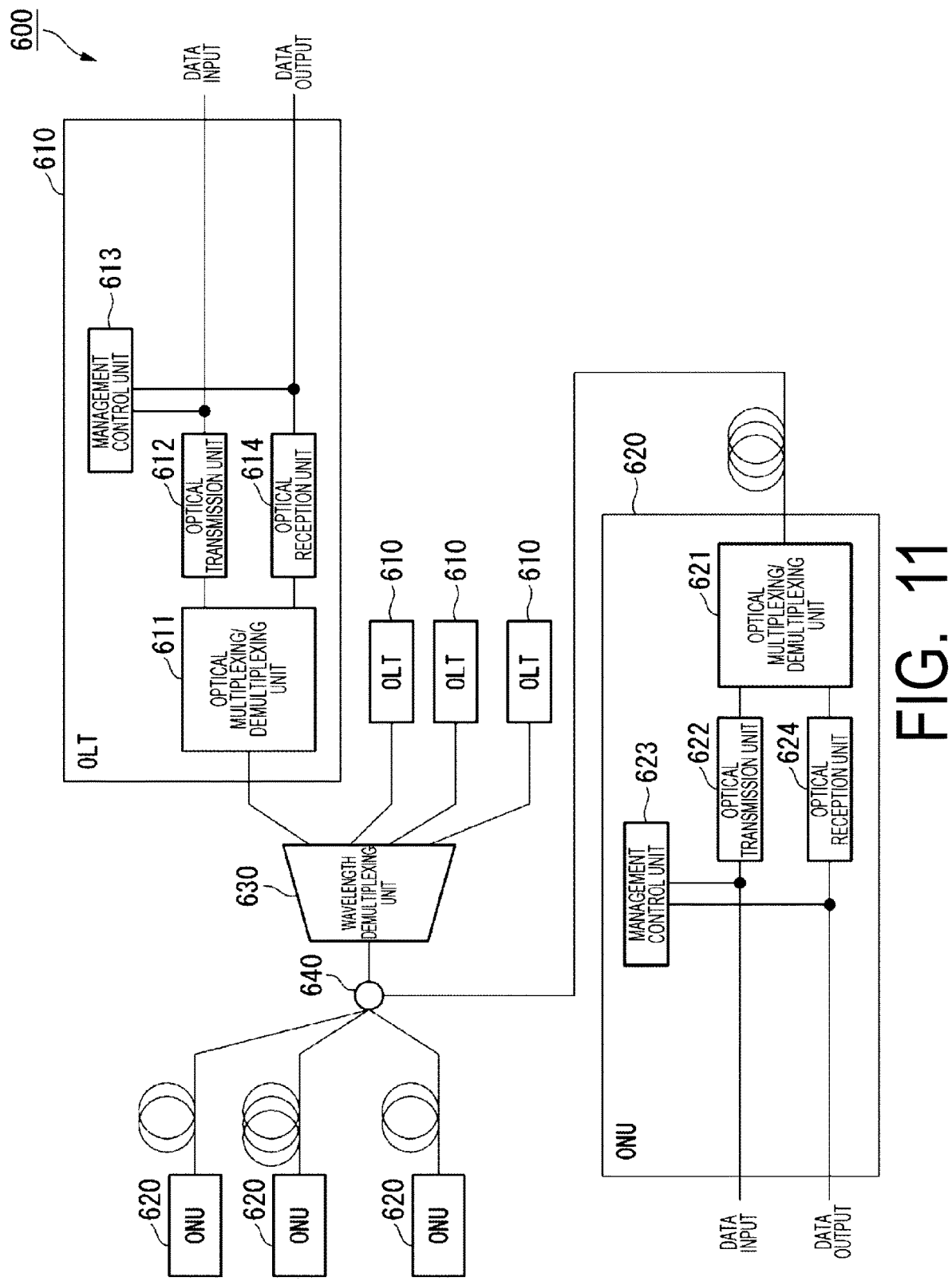
FIG. 11 is a diagram illustrating a configuration of a conventional PtP WDM-PON system.

In the first embodiment and the second embodiment, the configuration has been described in which the AMCC signal is extracted in the OLT 10; however, as illustrated in FIG. 9, a configuration may be adopted in which some or all of the divided AMCC signals may be extracted between the OLT 10 and the ONU 20. An optical fiber, an optical distribution function unit (for example, an optical splitter), an optical device, and the like are included between the OLT 10 and the ONU 20.

FIG. 9 is a diagram illustrating an example configuration of an optical access system 1b in a modification.

The optical access system 1b includes an OLT 10, one or more ONUs 20, and a management control device 60. The OLT 10, the ONUs 20, and the management control device 60 are connected to each other by one or more optical splitters 30, 40, and 50 and optical fibers.

The management control device 60 is provided between the OLT 10 and the ONUs 20, and extracts some or all of the divided AMCC signals. The management control device 60 includes an optical reception unit (receiver) 61, an AMCC signal extraction unit (signal extractor) 62, an AMCC signal integration unit (integrator) 63, and an AMCC signal reception unit 64.

The optical reception unit 61 includes therein an O/E converter such as a photodetector. The optical reception unit 61 receives an optical signal transmitted between the OLT 10 and each ONU 20, converts the received optical signal into an electrical signal by the O/E converter, and outputs the electrical signal to the AMCC signal extraction unit 62. The optical reception unit 61 may receive an optical signal split from an optical splitter provided between the OLT 10 and the ONU 20, for example.

The AMCC signal extraction unit 62 performs processing similar to that of the AMCC signal extraction unit 151.

The AMCC signal integration unit 63 performs processing similar to that of the AMCC signal integration unit 152.

The AMCC signal reception unit 64 performs processing similar to that of the AMCC signal reception unit 153.

Note that, in the above configuration, in a case where the management control device 60 acquires some divided AMCC signals, the management control device 60 may transmit the acquired divided AMCC signals to the OLT 10.

The OLT 10, the ONUs 20 and 20a, and the management control device 60 in the above-described embodiments may be implemented by a computer. In that case, the program for implementing these functions may be recorded in a computer-readable recording medium, and the program recorded in the recording medium may be read and executed by a computer system to implement the functions. Note that the "computer system" mentioned herein includes an OS and hardware such as a peripheral device.

Also, the "computer-readable recording medium" refers to a portable medium such as a flexible disk, a magneto-optical disk, a ROM, or a CD-ROM, or a storage device such as a hard disk built in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. Also, the above program may be for implementing some of the functions described above, may be one capable of implementing the functions described above in combination of a program already recorded in the computer system, or may be one implemented by using a programmable logic device such as an FPGA.

Although the embodiments of the present invention have been described in detail with reference to the drawings, the specific configuration is not limited to the embodiments, and includes design and the like without departing from the spirit of the present invention.

INDUSTRIAL APPLICABILITY

The present invention can be applied to an optical access system that performs at least time division multiplexing.

REFERENCE SIGNS LIST

10 OLT (optical communication device)
20, 20a ONU (optical communication device)
60 management control device (optical communication device)
11, 21 optical multiplexing/demultiplexing unit
14, 22 optical reception unit
13, 23, 23a media access control unit
15, 24, 24a management control unit
12, 25 optical transmission unit
231, 231a report processing unit
232 gate processing unit
241, 241a AMCC signal generation unit
242 AMCC signal division unit
243, 243a transmission timing control unit

The invention claimed is:

1. An optical communication device that communicates with another optical communication device by using at least a time division multiplexing system, the optical communication device comprising:
a management control signal divider configured to divide a management control signal used for management and control, into a size falling within an assigned amount of transmission; and
a transmitter configured to transmit the divided management control signal, by superimposing the divided management control signal on a burst signal to be transmitted at an assigned transmission timing;
wherein the assigned amount of transmission is assigned from the another optical communication device to the optical communication device for transmission of a main signal.

2. The optical communication device according to claim 1, wherein the management control signal divider divides the management control signal into the sizes not exceeding the assigned amount of transmission.

3. The optical communication device according to claim 1, further comprising:
a transmission timing controller configured to superimpose the divided management control signal on the main signal at the assigned transmission timing, wherein
the transmitter modulates light output from a light source with a signal obtained by superimposing the divided management control signal on the main signal to generate the burst signal.

4. The optical communication device according to claim 1, further comprising:
a report processor configured to generate a report frame including a bandwidth request for transmitting the management control signal; and
a transmission timing controller configured to superimpose the divided management control signal on a dummy pattern at the assigned transmission timing, wherein
the transmitter modulates light output from a light source with a signal obtained by superimposing the divided management control signal on the dummy pattern to generate the burst signal.

5. The optical communication device according to claim 1, further comprising:
a transmission timing controller configured to superimpose the divided management control signal on the main signal or a dummy pattern at the assigned transmission timing, wherein
the transmitter modulates light output from a light source with a signal obtained by superimposing the divided management control signal on the main signal or the dummy pattern to generate the burst signal.

6. The optical communication device according to claim 1, wherein the management control signal divider divides the management control signal into the size falling within the assigned amount of transmission in order from a head.

7. An optical communication device that communicates with another optical communication device by using at least a time division multiplexing system, the optical communication device comprising:
a signal extractor configured to extract management control signal divided, in which a management control signal used for management and control is divided into a size falling within an assigned amount of transmission, being superimposed on a burst signal transmitted from the another optical communication device; and
an integrator configured to integrate the management control signal divided and restores the management control signal;
wherein the assigned amount of transmission is assigned from the optical communication device to the another optical communication device for transmission of a main signal.

8. An optical access system that performs communication between a first optical communication device and a second optical communication device by using at least a time division multiplexing system, wherein
the first optical communication device includes:
a management control signal divider configured to divide a management control signal used for management and control, into a size falling within an assigned amount of transmission; and
a transmitter configured to transmit the divided management control signal, by superimposing the divided management control signal on a burst signal to be transmitted at an assigned transmission timing;
wherein the assigned amount of transmission is assigned from the second optical communication device to the first optical communication device for transmission of a main signal, and
the second optical communication device includes:

a signal extractor configured to extract the divided management control signal being superimposed on the burst signal transmitted from the first optical communication device; and an integrator configured to integrate the divided management control signal to restore the management control signal.

9. The optical access system according to claim 8, further comprising another optical communication device including:

a receiver configured to be provided between the first optical communication device and the second optical communication device and receive the burst signal transmitted from the first optical communication device;

a signal extractor configured to extract the management control signal divided included in the burst signal received by the receiver; and an integrator configured to integrate the management control signal divided to restore the management control signal.

* * * * *